United States Patent [19]

Schiweck

[11] 3,912,804
[45] Oct. 14, 1975

[54] RENAL CLEARANCE METHOD EMPLOYING ISOMALTITOL

[75] Inventor: Hubert Schiweck, Obrigheim, Germany

[73] Assignee: Suddeutsche Zucker-Aktiengesellschaft, Mannheim, Germany

[22] Filed: Feb. 12, 1974

[21] Appl. No.: 441,889

[52] U.S. Cl. .................. 424/9; 23/230 B; 424/180
[51] Int. Cl.² ............... A61K 29/00; A61K 31/70; G01N 31/22; G01N 33/16
[58] Field of Search ............ 424/2, 9, 180; 23/230 B

[56] References Cited
FOREIGN PATENTS OR APPLICATIONS
2,217,628  10/1973  Germany
2,264,393  10/1973  Germany OTHER PUBLICATIONS
Miller, Text. of Clin. Path., Williams & Wilkins Balto, 7th Ed. 1966, pp. 394–395.
Wolfrom, JACS, Vol. 74, 1954 pp. 1062–1064.

Primary Examiner—Albert T. Meyers
Assistant Examiner—A. P. Fagelson
Attorney, Agent, or Firm—Armstrong, Nikaido & Wegner

[57] ABSTRACT

Isomaltitol, a compound of the formula

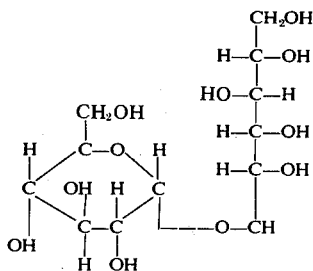

has been discovered to provide compositions useful for renal clearance tests, particularly when compared to the compositions for renal clearance testing which utilize inulin.

1 Claim, No Drawings

RENAL CLEARANCE METHOD EMPLOYING ISOMALTITOL

BACKGROUND OF THE INVENTION

In German Offenlegungsschrift No. 2,264,393, published Oct. 31, 1973, and corresponding to copending United States application Ser. No. 349,969, filed Apr. 11, 1973, now U.S. Pat. No. 3,865,957 there is disclosed the compound isomaltitol as an improved sweetening agent. A method for the preparation of isomaltitol is disclosed in German Auslegeschrift No. 2,217,628, published Oct. 31, 1973, which also corresponds to a pending United States application Ser. No. 349,974, filed Apr. 11, 1973.

As other compounds remotely related to isomaltitol, such as maltitol, do not share the same effectiveness in sugar sweetening properties, it is seen that this area of chemistry is highly unpredictable.

It has now been discovered that isomaltitol has wider utility than in the sugar field, with specific medicinal benefits.

SUMMARY OF THE INVENTION

An improved renal clearance test is provided whereby the compound isomaltitol is used as the test material. The isomaltitol is administered intravenously in an about 5–20 percent solution in a physiologically acceptable saline solution.

DETAILED DESCRIPTION OF THE INVENTION

In the process of making isomaltitol, isomaltulose serves as an intermediate.

Conversion by enzymic action takes place in a solution of sucrose of a concentration ranging between 15 and 40 percent, but preferably between 20 and 25 percent, at a temperature that lies between 20 and 37° C, while the substance is constantly aerated and agitated. The conversion process is completed within maximally 12 hours. The yield of isomaltulose amounts to 90 percent of the sucrose input. The conversion by enzymic action can be carried out either in batches or as a continuous process in a fermentation vat and using either a single- or a multiple stage process.

Upon completion of the enzymic conversion, the bacterial matter is removed from the solution by a separator, and some of it is recycled in the fermentation vat.

The solution is heated to a temperature between 60° and 90° C and then filtered; it is then de-ionized in a strongly acidic cation exchanger in the H-form and a weakly basic anion exchanger in the OH-form. The solution is subsequently evaporated to 40 percent of its solid content (dry substance) and can then be charged directly for hydrogenation; or else, the isomaltulose is first reduced to 60 to 70 percent of its dry content and chilled to 20° C while being agitated and allowed to crystallize. After crystallization the isomaltulose is separated from the mother liquor by way of a wire-basket centrifuge, and the mother liquor is recycled into further stages of crystallization. Isomaltulose crystallizes with 1 mole of water of crystallization; it has the following physical constants:

| | |
|---|---|
| Melting point | 123° – 124° C |
| $\alpha_D^{20}$ | +98.5° (c=1 in water) |
| Reducibility | 52% of glycose |

The manufacturing process described results in a considerably purer product than that described in German Pat. No. 1,049,800.

In the production of isomaltitol according to this invention, the process starts out with a 35 to 40 percent aqueous solution of crystalline isomaltulose condensed to 40 percent solids content; then a buffering mixture of sodium carbonate and magnesium carbonate is added (at the rate of 1:1 by weight); Raney nickel is added as a catalyst (approximately 8 kg per 100 kg isomaltulose, dry weight); the mixture is gradually heated to 130° C and then hydrogenized by raising the hydrogen pressure from 30 kg to 100 kg/cm². Hydrogenation is completed within 8 to 10 hours. When completed, the pH-value of the solution must read above 9 in order that only isomaltitol is produced by the hydrogenation process. Upon completion of this phase the Raney nickel is removed from the solution and the remaining substance is filtered and de-ionized in a strongly acidic cation exchanger in the H-form and a weakly basic anion exchanger in the OH-form.

When starting the process of hydrogenation in accordance with the invention by using crystalline isomaltulose, the end product will be 98% isomaltitol, the remainder, less than 2 percent with respect to dry matter, consists of other saccharides such as sorbitol, mannitol and unconverted isomaltulose and isomaltose. This solution, reduced by condensation to 60% dry matter, may be used directly in certain applications.

Isomaltitol in crystallized form is produced by purifying the solution upon hydrogenation as described above, and then effecting its crystallization through evaporation, thereby reducing its volume to 68 to 72% of dry matter, and finally cooling it down while it is being agitated. The crystallized isomaltitol is separated from the mother liquor by means of a wire-basket centrifuge, and then dried. The mother liquor is subjected to additional cycles of crystallization with the final stage employing a 50 to 60% aqueous solution of methanol. In the mother liquor finally remaining, the factor of impurity increases. By organizing the process of crystallization in multiple stages, more than 85% of isomaltitol can be recovered in crystalline form.

The physical constants are:

| Isomaltitol | Melting point | 141° – 142° C |
|---|---|---|
| | $\alpha_D^{20}$ | +85.0° (c=2 in water) |
| | Reducibility | 0.05% of glucose |

For comparison, a derivative is shown:

| Isomaltositolnanoacetate: | | |
|---|---|---|
| | Melting point | 98° to 99° |
| | $\alpha_{20}^D$ | +75.9° (c=2 in ethanol) |

The solubility of isomaltitol and isomaltulose with dependence upon temperature is shown in the enclosed FIG. 1. It demonstrates the comparison in solubility with that of sugar (sucrose). Therefore the solubility of isomalitol is sufficient to cover the entire range of temperatures so as to warrant its use in the preparation of foods and beverages in the lace of sugar.

The viscosity of solutions of isomaltitol (FIG. 2) is somewhat greater than that obtained from sucrose solutions containing equal amounts of solid matter. The higher viscosity, however, is of little practical consequence for the range of application for solutions of higher concentration; a 60 percent solution of isomaltitol has the same viscosity as a 62 percent solution of sugar. In the range under 30 percent concentration, the absolute increase in viscosity offers a technological advantage for processed foods and beverages since it enhances the flavor.

At room temperature, solutions containing 1 N acids will not break down even in 150 hours of exposure. The decomposition factors for isomaltitol in HCl-solutions of 1N, 0.1N and 0.1N (100 g isomaltositol/*l*) at 100°C are shown in FIG. 3. Accordingly, isomaltitol is broken down in 1N hydrochloric acid within 2 hours at 100°C, while a 0.01N solution of hydrochloric acid effects a mere 25% breakdown within 10 hours. Isomaltitol is thereby proven to be considerably more stable in its resistance to acids than all sweeteners heretofore known which are based on carbohydrates.

While isomaltulose can be caused to ferment only by certain specific types of yeast (C.C. Emeis & S. Windisch, Zeitschrift fur die Zuckerindustrie, 10, 248–249, 1960), isomaltitol is totally impervious to fermentation induced by yeast. Furthermore, isomaltitol will not be broken down by either commercially used preservative additives or by purified -glucosidases, even if kept at room temperature for one week. On the basis of these findings it may be assumed that isomaltitol will not be broken down by the glucosidases anchored in the mucous tissues of the human intestine (small), and that consequently they will not be reabsorbed. The hypothesis of stability and non-reabsorption has been confirmed The use of isomaltitol in kidney clearance determination provides a valuable step forward in the art, as it obviates a problem of the known kidney clearance test substance, inulin. Since inulin is a high-molecular polysaccharide (molecular weight approximately 5,000), it is difficult to dissolve it in aqueous solutions and it can therefore be injected only in the hot condition. For this reason, it has recently been attempted to partially decompose inulin and to employ the polyfructusane formed thereby for clearance determination. Inulin and also polyfructusane are not chemically uniform compounds (various molecular weight) and are therefore not optimally suitable as test substances.

In contradistinction thereto, isomaltitol is a compound which crystallises well and can therefore be readily prepared with the required degree of purity, and it is also readily water-soluble. Furthermore, isomaltitol contains no reducing end groups and also does not change due to the necessary sterilisation procedure.

Surprisingly, it has been found that isomaltitol can be used in simple and exact manner as test substance for kidney clearance determination. Accordingly, the invention relates to a test substance for kidney clearance determination, characterised in that it consists of isomaltitol.

Isomaltitol, applied in intravenous form, is distributed uncracked (or unsplit) in the body water and is excreted, unchanged, via the kidney. Since isomaltitol dissolves well in water and can readily be detected analytically, it is, as test substance, superior to hitherto known test substances for clearance determination.

The kidney clearance testing composition of the invention comprises a solution containing from about 5 to 20 percent of isomaltitol, in an aqueous physiologically acceptable saline solution. A preferred amount to be used is an 10 percent aqueous solution of isomaltitol.

The total amount of the said composition which is utilized for a kidney clearance test is from about 20 ccm to about 500 ccm applied in intravenous form in accordance with the Kreienberg et al method.

The methods of carrying out the kidney clearance test is the standard one which is used with inulin, substituting, however, the composition of the present invention for the inulin composition of the prior art. The inulin method is described by Professor Kreienberg and Dr. Czok, *Anleitung fuer das Clearance-Verfahren mit Inulin* (Linz and Donau, Germany; Laevosan-Gesellschaft)

The following examples serve to further illustrate the invention and are illustrative of the invention:

EXAMPLE 1

Conversion of sucrose to isomaltulose through enzymes.

Serum drawn from *protaminobacter rubrum* or *serratia plymuthica* is injected into a nutrient conglomeration consisting of 2 l. of sterilized tapwater and enriched with 6 g. Liebigs beef extract, 20 g. peptone, 6 g. sodium chloride, 4 g. disodium hydrogenphosphate, 10 g. yeast extract, and 100 g. sucrose. The pH of the substrate is stabilized at 7.0 and the mixture kept within a temperature range between 20° and 30° C and constantly agitated. Within 24 hours the bacteria have multiplied to the extent that transformation of sucrose into isomaltose has been completed within 12 hours.

The bacterial substance together with nutrient solution is combined with 4 kg. sucrose and added to 16 kg. of water; the mixture is constantly agitated and aerated to allow the bacteria to act upon the sucrose and, the pH is held at 7.0.

Within 12 hours practically the entire content of sucrose has been converted into isomaltulose. The bacterial content is then isolated by means of jet-separator and the remaining fluid recycled for additional conversion. Under controlled conditions of sterility, the same batch of bacteria can be recycled six times.

Should fructose and glucose also be prepared in the course of the process in addition to isomaltulose, these can easily be brought to fermentation through the addition of a quantity of saccharomyces cerevisiae. The resulting yeast is removed in a separator and the solution of isomaltulose is de-ionized in 1 l. of a strongly acidic cation exchanger in H-form (AMBERLITE 200) and a weakly basic anionic exchanger in OH-form (AMBERLITE IRA 93).

The solution, upon de-ionization, is condensed in a vacuum to 65% dry matter (solid) and the condensed solution agitated while it cools down to 20° C. Isomaltulose crystals are separated by means of a screen-basket centrifuge. Yield is 900 g. to 950 g.

The mother liquor, upon removal of crystals, is again condensed in a second and third cycle. Total yield runs approximately 1.8 kg.

EXAMPLE 2

For a continuous process of transformation proceed as follows: Besides the substrates described in Example 1, various other solutions may be used for the rapid multiplication of bacteria. Water from mash production containing 4% solids, which contains 1% sugar or 1.5% molasses, is a suitable medium. This nutriment is sterilized and poured into a fermentation vat. It is then inoculated with the fluid in which the bacterial culture is suspended. While constantly agitating and aerating the mixture, the gestation period takes between 25 and 30 minutes at 30° C; the pH is held between 6.5 and 7.5 by the addition of acids and bases as required. When the planned concentration of bacteria has been accomplished, (i.e., 6 g/l) it is continuously drawn off the fermentation vat and immediately replaced by an equal amount of nutriment.

The bacterial concentrate is combined with syrup (obtained from the sugar industry) and reduced to contain 30% of dry solids in a ratio of 1:2 by weight, and the mixture is passed over a set of cascaded agitators comprising between 3 and 5 units. To ensure the complete conversion of sucrose into isomaltulose at room temperature and under constant aeration, an average time of four hours must be allowed for the conversion process, and the capacity of the agitator vats must be planned accordingly.

Upon completion of the conversion process, the bacterial mass is removed by a centrifugal jet separator. A portion of bacterial fluid is diluted with the new supply of sterilized water to a concentration of 6 g./l, and recycled. The solution of isomaltulose is processed according to the method described above.

EXAMPLE 3

The production of isomaltitol from isomaltulose

Dissolve 20 kg. isomaltulose in 30 kg. distilled water. Add 65 g. sodium carbonate (calculated free of water) and 65 g. magnesium carbonate, and 1.6 kg. Raney nickel type B 113Z as a catalyst. Pour the solution into an autoclave. Rinse with nitrogen and pressurize at 30 kg/cm$^2$ while adding hydrogen. As soon as a temperature of 100°C is reached, absorption of hydrogen sets in the pressure drops to 8 kg/cm$^2$ within one hour. Again increase the hydrogen pressure to 100 kg/cm$^2$ while maintaining a temperature of 125° to 129°. After 10 hours the absorption of hydrogen is completed and the solution is drained from the autoclave; the Raney nickel is removed by centrifuge. The pH-value of the solution amounts to 9.5. The solution has a reduction factor of < 0.5 percent of glucose, based on solid ingredients.

The hydrogenized solution is heated and silica added; then the solution is filtered in a high-pressure squeezer and subsequently de-ionized in 2 l. of a strongly acidic cation exchanger in the H-form (AMBERLITE 200) and 2 l. of a weakly basic anion exchanger in the OH-form (AMBERLITE IRA 93). The resultant solution is completely colorless. It is condensed in vacuum to 70 percent of its dry matter and allowed to crystallize at 45°C during agitation. While the crystallization process takes place, the temperature is gradually lowered to 20°C.

The party crystallized mass is passed through a sieve-centrifuge to separate the crystals from the mother liquor. The dry matter contained in the mother liquor amounts to 59 percent. The yield of isomaltositol is 10 kg. The mother liquor is again steamed and undergoes another cycle the same as described above. Yield in isomaltitol is 5 kg in this second phase. After the second cycle, the method liquor is condensed to 70 percent of dry matter and enough methanol is added so as to result in an aqueous solution of 55 percent strength. The isomaltitol, upon forming crystals, is separated from the mother liquor by high-pressure squeezing.

Total yield in isomaltitol: 18,5 kg.

EXAMPLE 4

Breakdown of isomaltitol by α-glucosidases 5 g of isomaltisitol crystals were dissolved with 0.1N acetate buffer in 100 ml. water to a pH of 4.6 and 2 mg. of Invertase (BOEHRINGER MANHEIM No. EC 3.2.1.26, 150 units/mg) were added. The optial rotation in the resultant solution was measured and found to be +8.796° in a 2-dm tube. Within 14 days no change in rotation had occurred.

EXAMPLE 5

An ampoule is prepared for intravenous injection. The ampoule contained 20 ccm of isomaltitol-solution, made from a 10 percent solution of isomaltitol in an aqueous, physiologically accepted saline solution. The patient is then administered 20 ccm of the said composition intravenously, and the renal clearance is measured in accordance with the test method described in the above Kreienberg et al reference at page 9.

EXAMPLE 6

Ampoules are prepared with 50 ccm of 10 percent solution of isomaltitol, with intravenous injection of first 20 ccm and then, after 20 minutes, a further 30 ccm was administered otherwise following the second procedure set forth at page 5 of the Kreienberg et al reference.

What is claimed is:

1. In the method of providing a renal clearance test wherein a test substance is injected into a patient intravenously and the amount of the test substance passing through the kidneys is measured from the content of the said test substance in the subsequently passed urine, the improvement which comprises administering to said patient as a substitute for inulin normally used as the test substance therein a 5–20 percent solution of isomaltitol in a physiologically acceptable saline solution.

* * * * *